US006942144B2

(12) United States Patent
Brookner

(10) Patent No.: US 6,942,144 B2
(45) Date of Patent: Sep. 13, 2005

(54) SECURE REMOTE ACCESS TO METERING PRODUCT ENCLOSURE

(75) Inventor: George Brookner, Norwalk, CT (US)

(73) Assignee: Neopost Industrie SA, Bagneux (FR)

(*) Notice: Subject to any disclaimer, the term of this patent is extended or adjusted under 35 U.S.C. 154(b) by 145 days.

(21) Appl. No.: 10/355,907

(22) Filed: Jan. 31, 2003

(65) Prior Publication Data

US 2004/0099733 A1 May 27, 2004

Related U.S. Application Data

(60) Provisional application No. 60/429,446, filed on Nov. 26, 2002.

(51) Int. Cl.[7] ........ G06K 5/00

(52) U.S. Cl. ........ 235/382; 902/31; 340/5.2; 340/5.6; 705/410

(58) Field of Search ........ 235/382, 382.5, 235/375, 101, 432; 902/31; 705/401, 410, 403; 340/5.2, 5.21, 5.3, 5.51, 5.6; 700/237

(56) References Cited

U.S. PATENT DOCUMENTS

| | | | | | |
|---|---|---|---|---|---|
| 3,792,446 | A | * | 2/1974 | McFiggins et al. | 705/403 |
| 4,506,344 | A | * | 3/1985 | Hubbard | 705/401 |
| 4,629,871 | A | * | 12/1986 | Scribner et al. | 235/375 |
| 4,922,817 | A | * | 5/1990 | Holodnak | 101/91 |
| 5,434,399 | A | * | 7/1995 | Barbe | 235/382 |
| 5,671,146 | A | * | 9/1997 | Windel et al. | 705/410 |
| 5,699,415 | A | * | 12/1997 | Wagner | 380/43 |
| 5,901,644 | A | * | 5/1999 | Etheridge et al. | 101/71 |
| 6,256,616 | B1 | * | 7/2001 | Brookner | 705/401 |
| 6,344,796 | B1 | * | 2/2002 | Ogilvie et al. | 340/5.2 |
| 6,466,922 | B1 | * | 10/2002 | Abumehdi | 705/410 |
| 6,634,557 | B2 | * | 10/2003 | Kocznar et al. | 235/462.45 |
| 6,811,337 | B2 | * | 11/2004 | Hetzer et al. | 235/101 |
| 2002/0014950 | A1 | * | 2/2002 | Ayala et al. | 340/5.6 |
| 2002/0103653 | A1 | * | 8/2002 | Huxter | 705/1 |
| 2002/0138770 | A1 | * | 9/2002 | Dutta | 713/202 |
| 2002/0169623 | A1 | * | 11/2002 | Call et al. | 705/1 |
| 2004/0051624 | A1 | * | 3/2004 | Cuenot et al. | 340/5.6 |

FOREIGN PATENT DOCUMENTS

EP 0 603 169 A2 * 6/1994

* cited by examiner

*Primary Examiner*—Jared J. Fureman
(74) *Attorney, Agent, or Firm*—Perman & Green, LLP.

(57) ABSTRACT

A system for providing remote control access to internal components of a device. The system comprises a housing comprising a cover and a base, at least one device being located within the housing and at least one latching mechanism internal to the housing adapted to secure the cover to the base. A control sender is adapted to communicate with the device and the at least one latching mechanism to command the latching mechanism to unsecure the housing in order to allow access to the internal components of the device when a users identity is verified.

7 Claims, 6 Drawing Sheets

SECURE REMOTE ACCESS TO METERING PRODUCT ENCLOSURE

CROSS-REFERENCE TO RELATED APPLICATIONS

This application claims priority from U.S. Provisional Application No. 60/429,446, filed Nov. 26, 2002.

BACKGROUND OF THE INVENTION

1. Field of the Invention

The present invention generally relates to protective housings and in particular to a protective housing for a postage printing device.

2. Brief Description of Related Developments

Most, if not all postage printing devices are enclosed within a housing, which acts not only as a decorative or protective mechanism, but also provides security against attacks on internal components. Access to internal components within the housing typically requires breaking of security seals, break-off screws, key, padlocks, or the like. All these protective mechanisms are prone to compromise by an attacker. The seal may be replicated, break-off screws drilled out and replaced, key locks or padlocks picked. Systems have been developed and are presently in commercial use that deploy one or more of these security features. However, security is only marginally assured, and a dedicated attacker may gain unnoticed access to the internals of the product. To remedy the short comings of the above-methodology, this invention eliminates the need for the security mechanisms.

SUMMARY OF THE INVENTION

In one aspect the present invention is directed to a system for providing remote control access to internal components of a device. In one embodiment, the system comprises a housing comprising a cover and a base, at least one device being located within the housing and at least one latching mechanism internal to the housing adapted to secure the cover to the base. A control sender is adapted to communicate with the device and the at least one latching mechanism to command the latching mechanism to unsecure the housing in order to allow access to the internal components of the device when a users identity is verified.

In another aspect, the present invention is directed to a method for accessing internal components of a device within an enclosure. In one embodiment, the method comprises receiving and access requests, verifying an identity of the user making the access request, transmitting an authorization code identifying the user as authorized to access the internal components of the device within the closure, and commanding at least one latching mechanism within the enclosure to release the enclosure to enable the user to access the internal components of the device.

In a further aspect, the present invention is directed to a system for remotely releasing an enclosure of a device. In one embodiment, the system comprises at least one latching mechanism internal to the enclosure that is adapted to secure the enclosure around the device to prevent unauthorized access to the device. An access control system is coupled to the at least one latching mechanism and is adapted to allow a user to enter an access request and upon verification allow the latching mechanism to unsecure the enclosure. A data center is coupled to the access control system and is adapted to verify the access request and issue a command enabling the access control system to allow the latching mechanism to secure the enclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
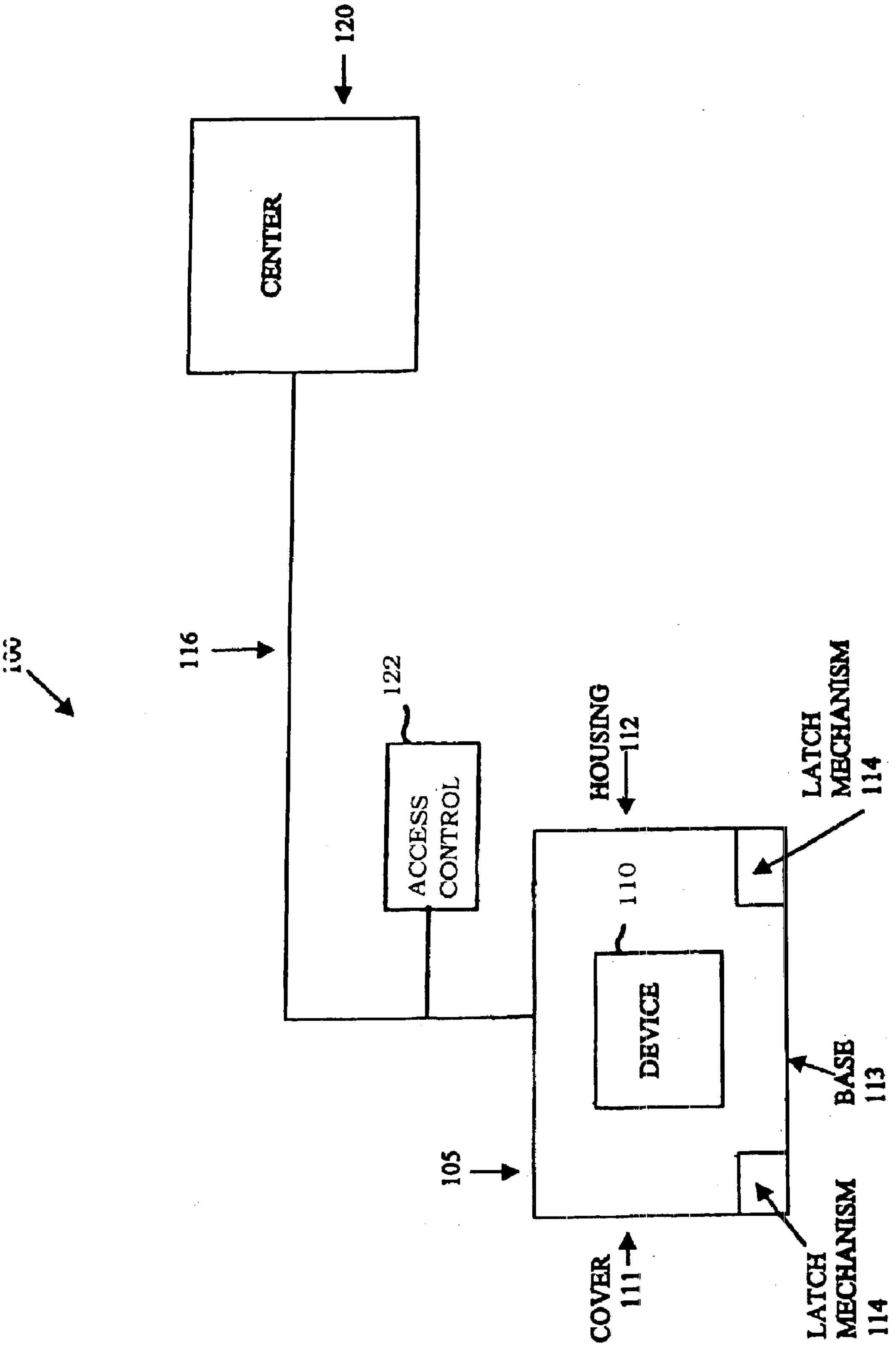
FIG. 1 is a block diagram of a system incorporating features of the present invention.

Referring to FIG. 1, a block view of a system 100 incorporating features of the present invention is illustrated. Although the present invention will be described with reference to the embodiments shown in the drawings, it should be understood that the present invention can be embodied in many alternate forms of embodiments. In addition, any suitable size, shape or type of elements or materials could be used.

As shown in FIG. 1, the system 100 generally comprises a device or system 105 that requires a secure housing. The system or device 105 is connected or coupled to a control or data center 120. The system 100 is generally adapted to control access to the internal components of the system or device 105. The present invention eliminates the need to adapt mechanical security locking mechanisms, though which unlocking methods are required, to gain access to internal components of the housing 112, within for example, an enclosed printing mechanism. This is accomplished using internal latching mechanisms 114 controlled by authorization from a remote "center" 120. There is no longer a need to add any external mechanisms, which must be breached in order to gain access to internal components of the printing device 110. In alternate embodiments, the system 100 can include such other suitable components to remotely control access to internal components of a device within a housing. It is a feature of the present invention to provide secure, remote control access, to internal components of a device within an enclosure. The enclosure would not need any mechanical entry mechanisms, such as for example, keys, locks, seals, or the like.

The system or device 105 generally comprises a device 110, such as for example a postage meter, and a housing 112 that encloses the device 110. Although the present invention is generally described in terms of protecting a postage meter, the present invention is not so limited and can be applied to any device that has a housing or enclosure where the device requires some kind of protection from unauthorized intrusion. It is a feature of the present invention to provide a remotely controlled and varying mechanism adapted to unlock or enable enclosure access to the internal components of a device, such as for example, gaining authorized internal access to a postage printing device.

As shown in FIG. 1, the housing 112 includes latching mechanisms 114. The latching mechanisms 114 are generally adapted to secure the housing 112 so that the device 110 is not accessible from the outside unless the latching mechanism(s) 114 are "released" or "unlocked" so that the housing 112 can be opened or removed. Although two latching mechanisms 114 are shown in FIG. 1, that is merely illustrative, and the present invention could include only one latching mechanism or more than two latching mechanisms.

The housing 112 can be made of any suitable material to form a protective cover or enclosure that provides security against attacks or undesired intrusion on internal components. The housing 112 can comprise a single piece housing, or a multiple segment or compartmentalized unit. Generally the housing 112 includes at least one cover portion 111 and at lease one base portion 113. In alternate embodiments any suitable cover or housing arrangement can be used to protect one or more components/devices internal to the housing 112. It is a feature of the present invention to enclose a device, such as a postage meter, in a protective housing that provides security against attacks on internal components and allows only authorized access, preferably by remote or computerized control.

The latching mechanism 114 generally comprise a device that will secure or "lock" the housing 112 to prevent access to the components internal to the housing 112. The latching mechanism 114 is located in the interior of the housing 112, and is generally not accessible from the exterior of the housing 112 without damage to the housing. The latching mechanism 114 is adapted to be remotely controlled from outside the housing. In one embodiment, a signal is sent to the latching mechanism 114 that commands the mechanism to secure or unsecure the housing 112. This can also be referred to as opening or closing, or locking or unlocking. The signal, which could be an electronic signal or transmission, that is transmitted from for example, the center 120 to the system 105. The system 105 is adapted to, and includes electronics to, receive and interpret an authorization signal from the center, and cause the latching mechanism 114 to latch or unlatch. In alternate embodiments the signal can be transmitted from any suitable source to the latching mechanism 114.

In one embodiment, referring to FIG. 1, the system 100 can include an access control system 122. The access control system 122 can comprise the electronics described above and be adapted to allow a user to enter an authorization request. The access control system 122 can transmit the authorization request to the center 120 for verification. In one embodiment, the access control system 122 could also be adapted to verify the request. The access control system 122 can also receive the verification command from the center 120 and enable the latching mechanism 114 to unlatch, if the authorization request is verified. In one embodiment, the center 120 could communicate directly with the latching mechanism 114 and system 105.

The access control system 122 could also be adapted to record the data and information from the latching mechanism 114 and system 105 for transmission to the center 120. In one embodiment, the access control system 122 is an integral part of the system 105. Alternatively, it is a stand alone or remote unit. The access control system 122 could also incorporate or integrate the computer 201 discussed with reference to FIG. 2, on the input device 310 described with reference to FIG. 3. In one embodiment, the access control system 122, computer 201 and input device 310 could also comprise a single unit that is integrated into the system 105 or a stand-alone or remote unit.

In one embodiment, the control center 120 can transmit a command to the system 105 that instructs the latching mechanism 114 to secure the housing 112. This can include securing the cover 111 to the base 113. Another command or instruction could cause the latching mechanism 114 to "unlock" or unsecure the housing 112 allowing the cover 111 to be removed from the base 113 and allow access to the internal components or device 110. The latching mechanism 114 can comprise any suitable device that can be remotely activated, and can include for example a rotating latch or shaft-driven lock.

Figure 2:
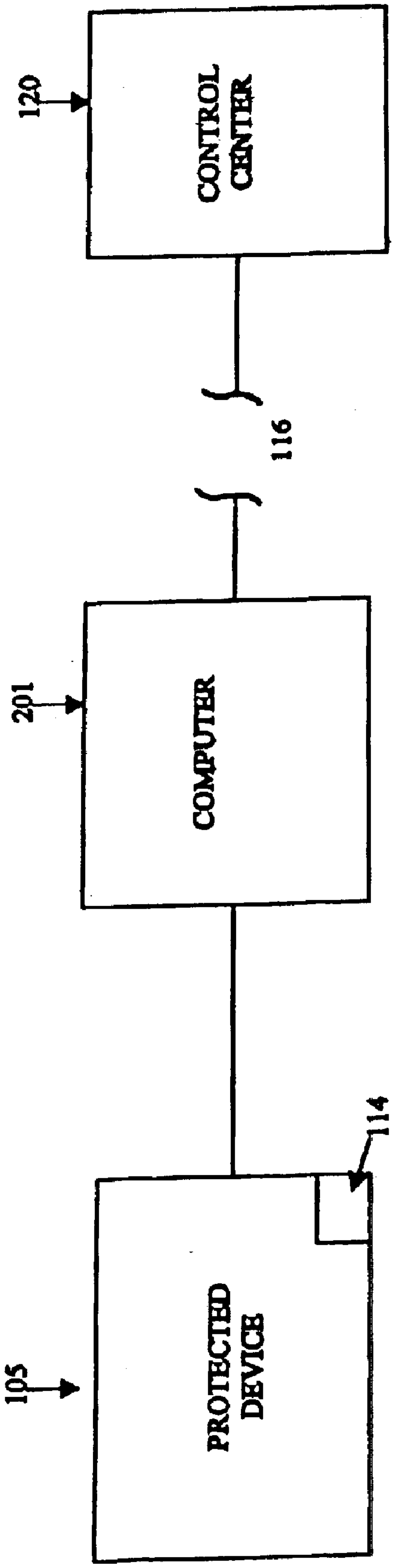
FIG. 2 is a block diagram of another embodiment of a system incorporating features of the present invention.

The center 120 can comprise any suitable device or system that is adapted to respond to requests for access, generate commands, and authorization codes or signals, record and store information and data, and control operation of the latching mechanism 114. The center 120 can include for example, a computer. Although the center 120 is shown in FIG. 1 as being remote from the system 105, in alternate embodiments the center 120 could be in any location relative to the system 105. In one embodiment, the center 120 could comprise a part of the system 105. Authorization codes or updates to authorization codes could be periodically downloaded to the center 120 to maintain a current list of authorized users. Any suitable means could be used to maintain a current list of authorized users for whom authorization codes or signals can be generated in order to unsecure the housing. The system 105 is adapted to be coupled to, for example, the computer 120. This can include a direct connection, or a remote connection, through for example, a modem, network or Internet connection. For illustration purposes, in FIG. 1, device 105 is coupled to control center 120 via a connection 116. As shown in FIG. 2, the system 105 could be also adapted to be coupled to one computer 201 located in close proximity to the device 105, and then that computer could then connect to the control computer 120 via any suitable means.

In one embodiment, the device 105 is adapted to provide information to the center 120, such as for example, information related to who requested access, the time, date or other information related to the request and when access was granted, internal register accounting data or other particulars concerning the electronics or devices within the enclosure.

Figure 3:
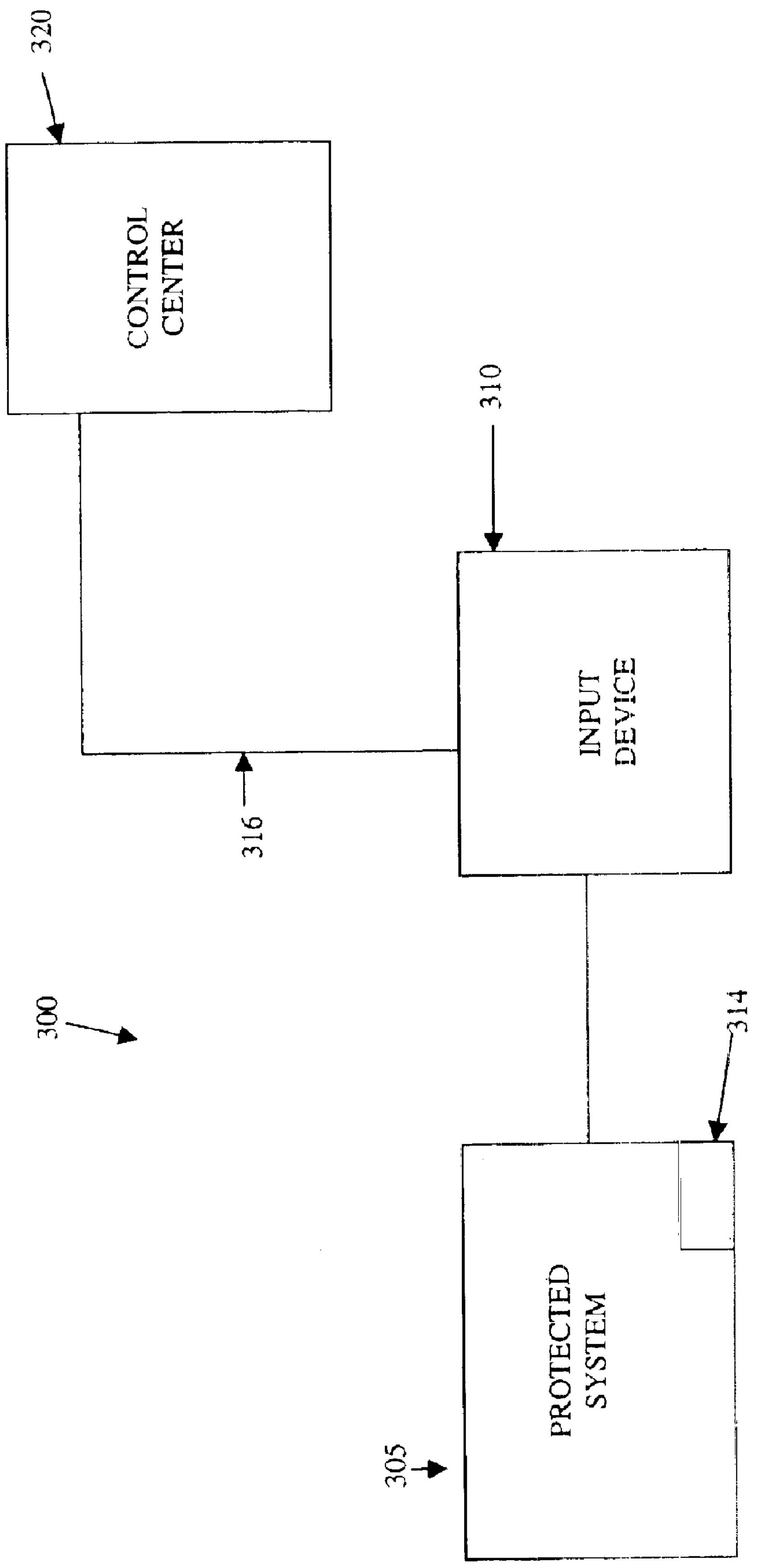
FIG. 3 is a block diagram of one embodiment of a system incorporating features of the present invention illustrating the use of an input device.

In one embodiment, referring to FIG. 3 the system 300 can include an input device 310 that is adapted to detect and identify an authorization code that will authorize access to the internal components of device 305. In one embodiment, the input device 310 can be adapted to receive an input, including an access request, and then pass that input on to the center 320 for verification and authorization. In another embodiment, the input device 310 could be self contained and maintain internally an authorized list of users that is periodically refreshed or updated. Upon receipt of an input, the device 320 can verify the input and generate or authorize a command to unsecure the enclosure. Although the input device 310 in FIG. 3 is shown as external to the system 305, in alternate embodiments the device 310 is an integral or embedded component of the system 305. For example, in one embodiment the input device 310 can include a keypad, graphical user interface or other touch-type device that allows an authorization code or access request to be entered that will initiate a process to authorize access to the internal components of device 305. The input device could also include a barcode reader, a scanner, a card reader, or even a key. When the authorization code is entered or an authorization signal generated., the latching mechanism 114 of FIG. 1 will "unlock". For example, a user desiring access may press an access request button or other such input. The input device 310 can then transmit the request to the center. If the request includes a user identification, the center 320 could verify the user identification and transmit an appropriate command that enables the latching mechanism to unlatch the enclosure. The center 320 could also request further identification from the user. In one embodiment, a user can obtain a code from the "center" 120 by for example telephone, fax, etc., that when keyed into the input device 310, will be authenticated by the input device 310 resulting in the device 305 releasing its enclosure latch(s) 114 and allowing access to the internal components. In another embodiment, the input device 310 can comprise a scanning device, barcode reader or card reader. When the input device 310 detects an authorized authorization code, a command will be sent to the latching mechanism 114 to unlock. In alternate embodiments, the input device 310 can comprise any suitable device that can identify an input, determine if the input authorizes access to the internal components of the device 305, and if so, generate an appropriate command. The device 310 can also include anti-tamper sensors that can determine if the device 310 is tampered with.

Referring to FIG. 3, in one embodiment, the system 305 includes a printing device. If a request for access is made and verified, the center 320 can command the printing device to print a special code on a medium. The code printed on the medium can be read by a suitable scanner or reader coupled to the device, which when scanned or read can be authenticated to and release the device 305 enclosure latching mechanism 314.

In one embodiment, the input device 310 can be adapted to communicate with the control center 320 in order to identify authorized codes that are inputted into the device 310, provide information to the control center 320 regarding access or attempted access to the system 305, or to obtain authorization to allow access to the internal components of system 305 based on information inputted into device 310.

The present invention can also be used to secure the device 105 against fraud and yet allow the device 105 to accept special printing media, such as tape, ticket material, postage stamp material, or special printing media directed to use for a specific purpose (e.g. printing on lotto tickets media, printing on postage stamps media, printing on event tickets media, etc.).

A barcode, such as for example a two-dimensional barcode, could be provided on each of the media materials at printing. The barcode could indicate the authenticity of the particular medium, which could comprise for example, a ticket, postmark, or coupon. The medium, when scanned or read, by an appropriate reader or scanner can be authenticated through a related center or database, such as center 320, or self-contained data on the media.

For example, a specialized media could be provided that is coded with for example, a two-dimensional barcode indicative of its authenticity. The device 310 would scan the barcode and if authenticated would allow printing. The barcode as scanned would be communicated between the device 310 and center 320 via public key cryptography to validate that the barcode is authentic and that the device is operating with that specific and unique media. Replenished media would be encoded uniquely from any other media and verified between the device 310 and center 120 with each access for media replenishment. Thus, in this way only authentic or authorized media can be used in the device 305.

Generally, it is preferable to utilize public key cryptography to secure both the communications between the device 105 and center 120, but also to provide re-keying of public and private keys to assure that the device is uniquely known to the center 120. With each new request to gain access to the internal components of the device, a completely new and unpredictable remote control coding for entry exits. Such public key cryptography may include RSA, DSA, and Elliptic Curve. It is also possible to utilize secret keying concepts that require an archival system to maintain knowledge of said secret keys. In alternate embodiments, any secure communications system can be utilized.

Figure 4:
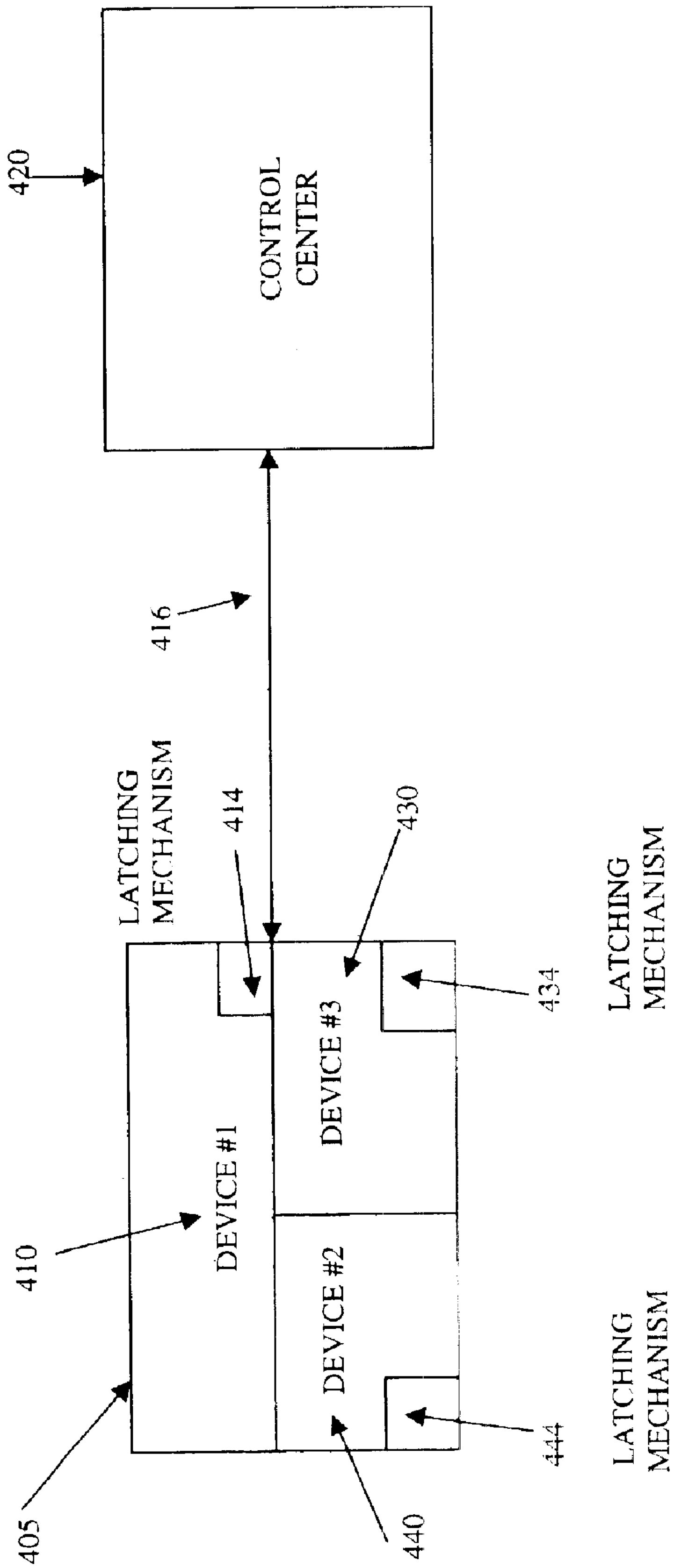
FIG. 4 is a block diagram of a multifunctional system incorporating features of the present invention.

Referring to FIG. 4, in one embodiment, the device 405 can be a multiple function device, and could include for example, a postage printing meter 410, a lottery ticket printer 430 and an event ticket printer 440. Each device 410, 430, 440, could have a separate enclosure and latching mechanism, 414, 434, and 444 respectively. In alternate embodiments, the device 405 can include any suitable number of functions or devices. It is a feature of the present invention to provide the device 405 with multiple functionality without the potential for compromising one function in favor of another. For example, if the device 405 comprises a postage printing meter, lottery ticket printer, an event ticket printer, each printing function may require its own special printing media, each different from the others. Access to these various printing media would be via the secure authorization through the center 420. Access would be allowed only to that media's specific housing access point/panel, and no other access point/panel would be compromised or opened.

In the event the device 110 of FIG. 1 requires servicing, the service agent or other such user could be provided with a unique identification to be inputted, by for example being scanned by the device 105 and communicated with the center 120, or keyed in by the service agent for verification by the center 120. The verification would allow one or more accesses to the device 110 internal components. Upon authentication to gain access, the history of the device 110 can be logged internally by the center 120. Such data could include service agent identification, date, time, internal register readings, and the like.

Figure 5:
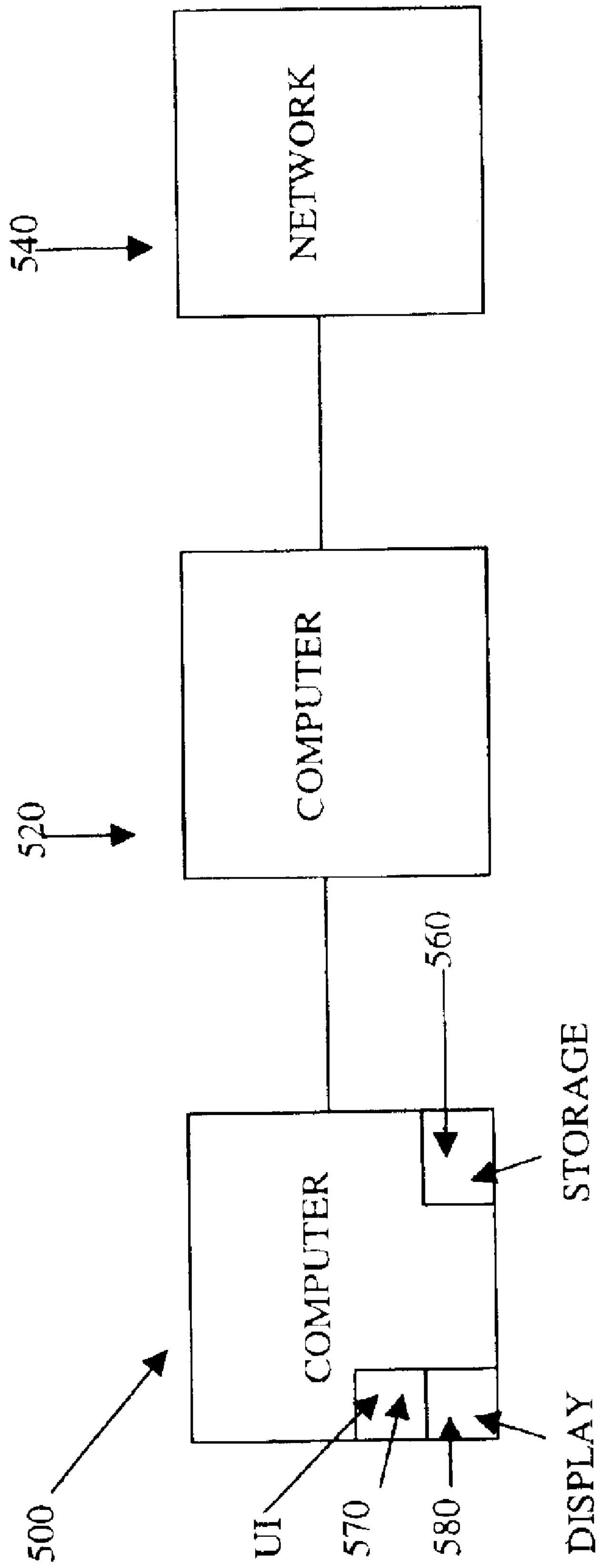
FIG. 5 is a block diagram of an apparatus that can be used to practice the present invention.

The present invention may also include software and computer programs incorporating the process , steps and instructions described above that are executed in different computers. In the preferred embodiment, the computers are connected to the Internet. FIG. 5 is a block diagram of one embodiment of a typical apparatus incorporating features of the present invention that may be used to practice the present invention. As shown, a computer system 500 may be linked to another computer system 520, such that the computers 500 and 520 are capable of sending information to each other and receiving information from each other. In one embodiment, computer system 520 could include a server computer adapted to communicate with a network 540, such as for example, the Internet. Computer systems 500 and 520 can be linked together in any conventional manner including a modem, hard wire connection, or fiber optic link. Generally, information can be made available to both computer systems 500 and 520 using a communication protocol typically sent over a communication channel or through a dial-up connection on ISDN line. Computers 500 and 520 are generally adapted to utilize program storage devices embodying machine readable program source code which is adapted to cause the computers 500 and 520 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 500 and 520 may also include a microprocessor for executing stored programs. Computer 500 may include a data storage device 560 on its program storage device for the storage of information and data. The computer program or software incorporating the processes and method steps incorporating features of the present invention may be stored in one or more computers 500 and 520 on an otherwise conventional program storage device. In one embodiment, computer 500 may include a user interface 570 and a display interface 580 from which features of the present invention can be accessed. Similar features might be found associated with computer 520. The user interface 570 and the display interface 580 can be adapted to allow the input of queries and commands to the system, as well as present the results of the commands and queries.

Figure 6:
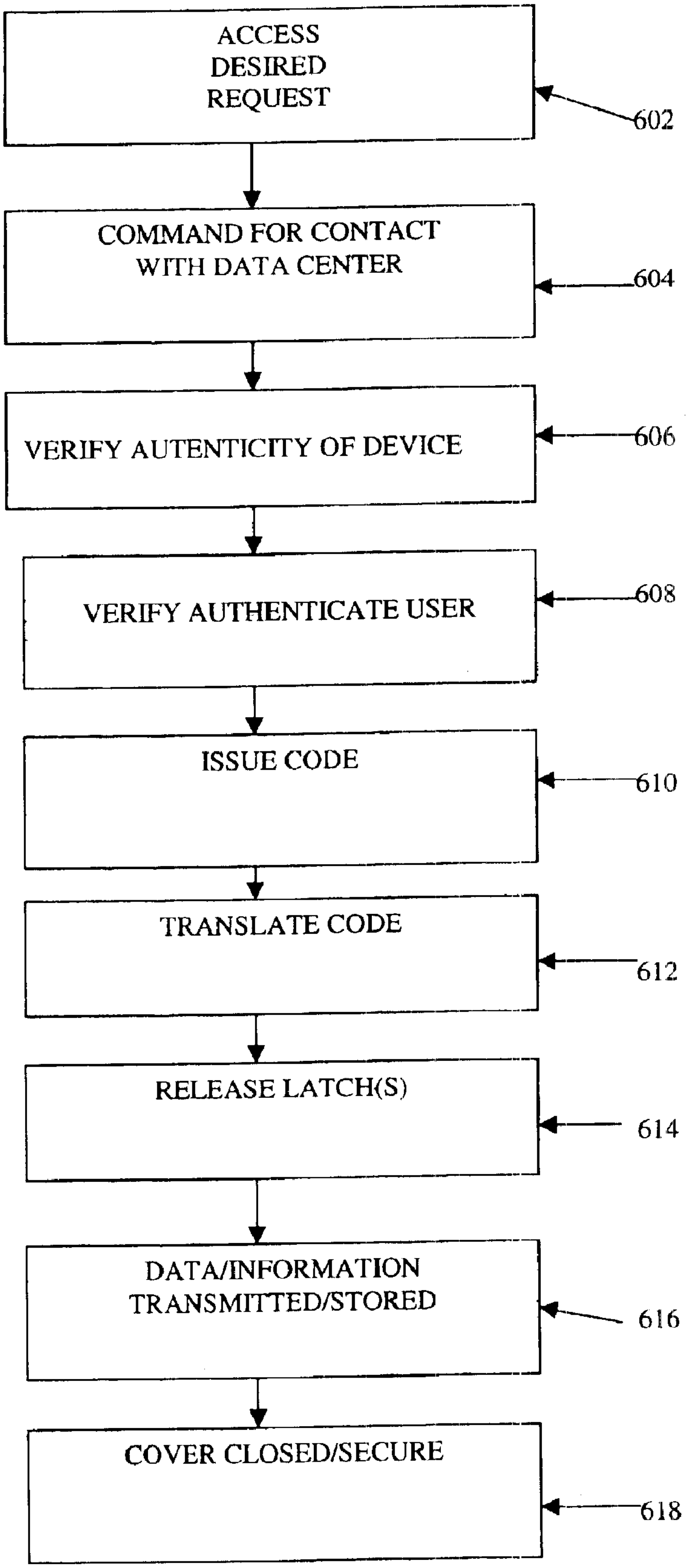
FIG. 6 is a flowchart illustrating one embodiment of a method incorporating features of the present invention.

FIG. 6 illustrates one embodiment of a method incorporating features of the present invention. If access, step 602, to the internal workings of the device 110 shown in FIG. 1 is required, the device 105 can be commanded 604 to contact the control center 120. The contact can be via any suitable communication method or means, and can include for example a menu option on the device 105, an external telephone call to the center 120, or a function key on the device 105. Although not shown in FIG. 1, the device 105 could include a graphical user interface or keypad like input device. In alternate embodiments, the computer 201 of FIG. 2 or the input device 310 could be used to contact the control center 120.

The center 120 and the device 105 can then communicate with each other, step 606, to verify that the device 105 is authentic. "Authentic" generally means that the device 105 is an authorized unit.

Once authenticated, and the user is identified, step 608, (e.g. PIN code, biometrics), the center 120 issues, step 610, a special code that can only be translated, step 612, and understood by the unique device 105 in contact with the center 120. The device 105 then proceeds to release, step 614, its internal latch(s) 114 to provide access to the desired internal components of device 110. The center 120 receives and archives, step 616, necessary access data as to who requested access, when access was made, internal register accounting data, and the like. Upon closing the access panel assembly 112, the center 120 verifies that fraudulent tampering has not taken place, and returns the device 105 to operation, step 618. The next access code is never the same as its previous counterpart.

In one embodiment, replacement of the cover 111 over the base 113 could automatically cause the latching mechanism 114 to secure the housing 112. The center 120 could then be notified that the housing 112 is secure. Alternatively, the user could notify the center 120 that access is not longer needed, and the center 120 could issue a command to secure the housing 112. If the cover 111 is not in place or the housing 112 is not secured after the latching mechanism 114 is commanded to secure, the center 120 could be notified of the unsecure state. In one embodiment, the device 110 could be disabled until the housing 112 is secured, either by the center 120 or by a mechanism internal to the device 105.

The present invention generally provides secure remote access to the internal components of a device within an enclosure. When a user's authorization is verified, access to the internal components of a device can be enabled by causing a latching mechanism internal to the enclosure to release. Thus, access to the internal workings of the device can be remotely controlled and recorded, as can other information related to the access request and the device.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for providing remote control access to internal components of a device comprising:

a housing comprising a cover and a base;

at least one internal component being located within the housing;

at least one latching mechanism internal to the housing adapted to secure the cover to the base;

a control center adapted to communicate with the device and the at least one latching mechanism, the control center being adapted to command the latching mechanism to unsecure the housing to allow access to the at least one internal component of the device;

a printer that is adapted to print a code on a medium in response to an access command from the center; and a reader adapted to read the code and authenticate the code, wherein when the code is authenticated, the latching mechanism is commanded to release the cover from the base.

2. The system of claim 1 wherein the latching mechanisms are not accessible from outside the housing when the cover is secured to the base.

3. The system of claim 1 wherein the device is a postage meter.

4. The system of claim 1 further comprising an input device associated with the housing and the device, the input device adapted to receive a request for access to the internal components of the device and request authorization from the control center to unsecure the housing.

5. The system of claim 4 wherein the input device is a scanner, a bar code reader, a graphical user interface or a keypad.

6. The system of claim 1 further comprising a data transfer device in the housing associated with the device and the latching mechanism adapted to communicate information and data related to access to the internal components of the device to the control center.

7. The system of claim 1 wherein the control center authorizes access to the internal components of the device by issuing an access code to the device and latching mechanism.

* * * * *